(12) United States Patent
Zhang et al.

(10) Patent No.: US 10,126,572 B2
(45) Date of Patent: Nov. 13, 2018

(54) AUTOMATIC ENDLESS POLARIZATION CONTROLLER FOR A SILICON-ON-INSULATOR PLATFORM

(71) Applicant: Huawei Technologies Co., Ltd., Shenzhen (CN)

(72) Inventors: Chunshu Zhang, Kanata (CA); Jia Jiang, Ottawa (CA); Dominic John Goodwill, Ottawa (CA); Patrick Dumais, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 95 days.

(21) Appl. No.: 15/087,449

(22) Filed: Mar. 31, 2016

(65) Prior Publication Data

US 2017/0285373 A1 Oct. 5, 2017

(51) Int. Cl.
  *G02F 1/01* (2006.01)
  *G02F 1/21* (2006.01)
  (Continued)

(52) U.S. Cl.
  CPC ......... *G02F 1/0136* (2013.01); *G02B 6/2773* (2013.01); *G02B 6/29302* (2013.01); *G02B 6/29344* (2013.01); *G02F 1/0121* (2013.01); *G02F 1/2257* (2013.01); *G02F 2001/0142* (2013.01); *G02F 2001/212* (2013.01)

(58) Field of Classification Search
  None
  See application file for complete search history.

(56) References Cited

U.S. PATENT DOCUMENTS 7,120,333 B2 10/2006 Eder et al.
7,822,298 B2 10/2010 Rasras
(Continued)

FOREIGN PATENT DOCUMENTS

WO 03036354 A3 5/2003
WO 03036841 A1 5/2003

OTHER PUBLICATIONS

International Search Report for PCT/CN2016/078573 dated Dec. 29, 2016.
(Continued)

*Primary Examiner* — Ryan Lepisto
*Assistant Examiner* — Erin Chiem

(57) ABSTRACT

A photonic platform based polarization controller providing a fixed target polarization is disclosed. The polarization controller has a polarization rotator splitter splitting the beam into first and second feeds corresponding to first and second orthogonal polarization components. A first Mach-Zehnder interferometer (MZI) stage provides a first phase delay between the first and second feeds based on a first control signal, and a first mixer mixes the first and second feeds to provide third and fourth feeds. A second MZI stage provides a second phase delay between the third and fourth feeds based on a second control signal, and a second mixer mixes the third and fourth feeds to provide fifth and sixth feeds. A third MZI stage provides a third phase delay between the fifth and sixth feeds based on a third control signal, and a third mixer mixes the fifth and sixth feeds to provide the fixed target polarization. An optical tap splits a portion of the beam.

15 Claims, 8 Drawing Sheets

(51) Int. Cl.
G02F 1/225 (2006.01)
G02B 6/293 (2006.01)
G02B 6/27 (2006.01)

(56) References Cited

U.S. PATENT DOCUMENTS

| | | | |
|---|---|---|---|
| 2002/0093706 A1* | 7/2002 | Lu | H04B 10/25137 398/81 |
| 2003/0210860 A1 | 11/2003 | Margalit | |
| 2005/0175339 A1* | 8/2005 | Herskowits | H04B 10/25073 398/1 |
| 2008/0031566 A1* | 2/2008 | Matsubara | G02B 6/12007 385/14 |
| 2015/0295672 A1* | 10/2015 | Okayama | H04J 14/02 398/65 |

OTHER PUBLICATIONS

Caspers, J. Niklas, et al., 'Active Polarization Independent Coupling to Silicon Photonics Circuit', SPIE Photonics Europe, p. 9133-9137, 2014.

Sacher, Wesley D., et al., 'Polarization Rotator-Splitters and Controllers in a Si3N4-on-SOI Integrated Photonics Platform', Optics Express; vol. 22, No. 9, May 5, 2014.

Doerr, Christopher R., et al., 'Monolithic PDM-DQPSK Receiver in Silicon', ECOC, p. PD 3.6, 2010.

Heismann, F., et al., 'Polarization-Independent Photonic Switching System Using Fast Automatic Polarization Controllers', IEEE Photonics Technology Letters, vol. 5, No. 11, Nov. 1993.

Sacher, Wesley D., et al., Polarization Rotator-Splitters in Standard Active Silicon Photonics Platforms, Optics Express, vol. 22, No. 4, Feb. 24, 2014.

* cited by examiner

AUTOMATIC ENDLESS POLARIZATION CONTROLLER FOR A SILICON-ON-INSULATOR PLATFORM

TECHNICAL FIELD

The present disclosure relates generally to polarization controllers for photonic integrated circuits and, more particularly, to endless polarization controllers for silicon-on-insulator (SOI) platforms.

BACKGROUND

Optical polarization controllers are devices for dynamic transformation of polarization state of incoming light. Polarization controllers are frequently required for photonic integrated circuits (PICs) operating in a single polarization state. External polarization components may be used to construct a polarization controller for a PIC. However, alignment and assembly of multiple off-chip optical components with respect to the PICs is often time-consuming and costly.

There is accordingly a need for an inexpensive polarization controller suitable for use with PICs.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

The present specification discloses an automatic endless polarization controller for a photonic platform, e.g. silicon-on-insulator platform. The polarization controller provides a controlled target polarization output, e.g. a transverse electric (TE) polarization output, from an optical input. Also disclosed is a method for providing a controlled target polarization output, e.g. a transverse electric polarization output, from an optical input on a photonic platform.

One aspect of the disclosure is a photonic platform based polarization controller for providing a fixed target polarization of an optical beam having first and second orthogonal polarization components. The polarization controller includes a polarization rotator splitter (PRS) for splitting the optical beam into first and second feeds corresponding to the first and second orthogonal polarization components, respectively, wherein the first and second feeds have a same fixed state of polarization. The polarization controller includes a first Mach-Zehnder interferometer (MZI) stage coupled to the PRS and comprising a first phase shifter for providing a first optical phase delay between the first and second feeds based on a first control signal, and a first mixer for mixing the first and second feeds having the first optical phase delay therebetween, to provide third and fourth feeds. The polarization controller also includes a second MZI stage coupled to the first MZI stage and comprising a second phase shifter for providing a second optical phase delay between the third and fourth feeds based on a second control signal, and a second mixer for mixing the third and fourth feeds having the second optical phase delay therebetween, to provide fifth and sixth feeds. The polarization controller further includes a third MZI stage coupled to the second MZI stage and comprising a third phase shifter for providing a third optical phase delay between the fifth and sixth feeds based on a third control signal, and a third mixer for mixing the fifth and sixth feeds having the third optical phase delay therebetween, to provide the optical beam having the fixed target polarization. The polarization controller further includes an optical tap optically coupled to the third mixer for splitting a portion of the optical beam.

Another aspect of the disclosure is a photonic platform based polarization controller for providing a fixed target polarization of an input optical beam having first and second orthogonal polarization components. The polarization controller includes a polarization rotator splitter (PRS) for splitting the input optical beam into first and second feeds corresponding to the first and second orthogonal polarization components, respectively, wherein the first and second feeds have a same fixed state of polarization. The polarization controller also includes a first phase shifter coupled to the PRS for providing a first optical phase delay between the first and second feeds based on a first control signal, and a first 2×2 optical coupler coupled to the first phase shifter for mixing the first and second feeds having the first optical phase delay therebetween, to provide third and fourth feeds. The polarization further includes a second phase shifter coupled to the first 2×2 optical coupler for providing a second optical phase delay between the third and fourth feeds based on a second control signal, and a second 2×2 optical coupler coupled to the second phase shifter for mixing the third and fourth feeds having the second optical phase delay therebetween, to provide fifth and sixth feeds. The polarization controller further includes a third phase shifter coupled to the second 2×2 optical coupler for providing a third optical phase delay between the fifth and sixth feeds based on a third control signal, and an output optical coupler coupled to the third phase shifter for mixing the fifth and sixth feeds having the third optical phase delay therebetween, to provide an output optical beam having the fixed target polarization. The polarization controller also includes an optical tap optically coupled to the output optical coupler for splitting a portion of the output optical beam.

Yet another aspect of the disclosure is a method of providing a fixed target polarization of an optical beam having first and second orthogonal polarization components. The method entails splitting the optical beam into first and second feeds corresponding to the first and second orthogonal polarization components, respectively, such that the first and second feeds have a same fixed state of polarization, adjusting a first optical phase delay between the first and second feeds based on a first control signal, and mixing the first and second feeds having the first optical phase delay therebetween to provide third and fourth feeds. The method further entails adjusting a second optical phase delay between the third and fourth feeds based on a second control signal and mixing the third and fourth feeds having the second optical phase delay therebetween to provide fifth and sixth feeds. The method further entails adjusting a third optical phase delay between the fifth and sixth feeds based on a third control signal and mixing the fifth and sixth feeds having the third optical phase delay therebetween to provide the optical beam having the fixed target polarization, and splitting a portion of the optical beam using an optical tap.

BRIEF DESCRIPTION OF THE DRAWINGS

These and other features of the disclosure will become more apparent from the description in which reference is made to the following appended drawings.

DETAILED DESCRIPTION OF EMBODIMENTS

The following detailed description contains, for the purposes of explanation, numerous specific embodiments, implementations, examples and details in order to provide a thorough understanding of the invention. It is apparent, however, that the embodiments may be practiced without these specific details or with an equivalent arrangement. In other instances, some well-known structures and devices are shown in block diagram form in order to avoid unnecessarily obscuring the embodiments of the invention. The description should in no way be limited to the illustrative implementations, drawings, and techniques illustrated below, including the exemplary designs and implementations illustrated and described herein, but may be modified within the scope of the appended claims along with their full scope of equivalents.

Figure 1:
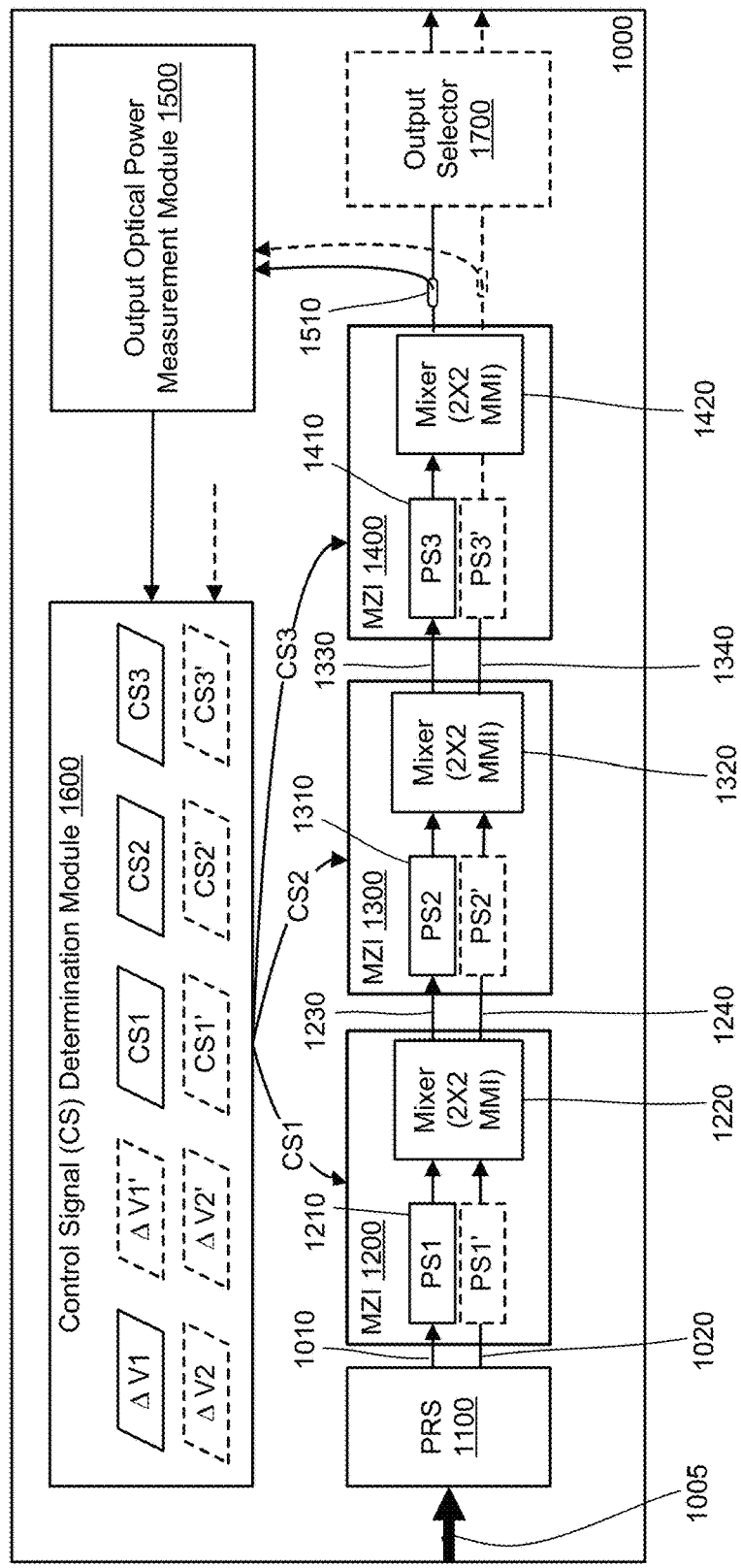
FIG. 1 depicts a photonic platform based polarization controller in accordance with at least some embodiments of the present invention.

In the embodiment depicted in FIG. 1, a photonic platform based polarization controller 1000 provides a fixed target polarization of an optical beam 1005 having first and second orthogonal polarization components. The polarization controller 1000 includes a polarization rotator splitter (PRS) 1100 for splitting the optical beam 1005 into first and second feeds 1010, 1020 corresponding to the first and second orthogonal polarization components, respectively. The first and second feeds 1010, 1020 have a same fixed state of polarization. The polarization controller 1000 includes a first Mach-Zehnder interferometer (MZI) stage 1200 coupled to the PRS 1100 and comprising a first phase shifter (PS1) 1210 for providing a first optical phase delay between the first and second feeds 1010, 1020 based on a first control signal CS1, and a first mixer 1220, e.g. 2×2 multi-mode interference (MMI) coupler, for mixing the first and second feeds 1010, 1020 having the first optical phase delay therebetween, to provide third and fourth feeds 1230, 1240. The polarization controller 1000 also includes a second MZI stage 1300 coupled to the first MZI stage 1200 and comprising a second phase shifter (PS2) 1310 for providing a second optical phase delay between the third and fourth feeds 1230, 1240 based on a second control signal (CS2), and a second mixer 1320 for mixing the third and fourth feeds 1230, 1240 having the second optical phase delay therebetween, to provide fifth and sixth feeds 1330, 1340. The polarization controller 1000 also includes a third MZI stage 1400 coupled to the second MZI stage 1300 and comprising a third phase shifter (PS3) 1410 for providing a third optical phase delay between the fifth and sixth feeds 1330, 1340 based on a third control signal (CS3), and a third mixer 1420 for mixing the fifth and sixth feeds 1330, 1340 having the third optical phase delay therebetween, to provide the optical beam 1005 having the fixed target polarization. The polarization controller 1000 also includes an optical tap 1510 optically coupled to the third mixer 1420 for splitting a portion of the optical beam 1005. The optical beam 1005, it should be noted, can be guided or free-space.

Herein and throughout the rest of the specification, the term "photonic platform based" means implemented in a photonic platform such as silicon platform, SOI platform, InP platform, and so on. The photonic platform can include waveguides and couplers of the PRS 1100, the MZI stages 1200, 1300, and 1400, and the optical tap 1510. Advantageously, the polarization controller 1000 may be built in a same photonic platform as the photonic devices requiring polarized input, alleviating a need of a precise optical alignment of external optical components. Furthermore, due to compactness of an individual polarization controller, arrays of polarization controllers 1000 may be fabricated on a same photonic platform, thereby facilitating optical integration. For the purposes of the present specification, the expression "MZI stage" is used instead of the term "MZI" because the MZI stage borrows (i.e. utilizes) the input splitter from the PRS 1100, or from a previous MZI stage.

In the embodiment depicted in FIG. 1, the first and second mixers 1220, 1320 may be 2×2 multimode interference (MMI) couplers. Alternatively, the first and second mixers 1220, 1320 may be 2×2 evanescent couplers or any other suitable couplers. The third mixer 1420 may be any suitable 2×2 or 2×1 coupler such as the MMI coupler illustrated by way of example in this figure.

In the embodiment depicted in FIG. 1, the polarization controller 1000 further includes an output optical power measurement module 1500 that includes a photodetector optically coupled to the optical tap 1510 for providing a photodetector signal based on the portion of the optical beam 1005. In the embodiment depicted in FIG. 1, the polarization controller 1000 further includes a control signal determination module 1600 coupled to the photodetector and to the first to third phase shifters 1210, 1310, 1410 and configured to provide the first to third control signals to the first to third phase shifters 1210, 1310, 1410, respectively, for increasing optical power of the optical beam 1005 based on the photodetector signal. The control signal determination module 1600 may be configured to gradually lessen a selected one of the first to third control signals when the selected control signal reaches a pre-defined threshold, while adjusting at least another one of the first to third control signals so as to maintain the fixed polarization and optical power level of the optical beam 1005 provided by the third mixer 1420. This technique provides endless polarization control.

In the illustrated embodiment of FIG. 1, the first, second and third MZI stages 1200, 1300, 1400 constitute a three-stage cascaded MZI. In this embodiment, the polarization controller 1000 has only three stages, i.e. it lacks a fourth cascaded MZI stage. The design having only three stages provides a simpler design while still providing endless polarization control.

In the embodiment of FIG. 1, the fixed (static) output polarization is the same polarization as is produced by the polarization rotator splitter 1100. Downstream of the polarization rotator splitter 1100 there are no further modifications to the state of polarization of the light. After the polarization rotator splitter 1100, only the phase and intensity of the light are modified.

It has been observed that the polarization expected from an optical output of a polarization device is highly correlated to the measurable optical power of the optical output whereby the maximum measurable optical power matches the expected polarization of the output. This correlation is exploited, in at least some embodiments, to obtain from an optical input of unknown polarization, two polarized feeds corresponding to the first and second orthogonal polarization components having distinct spatial modes on separate waveguides. Phase delays are introduced using phase shifters that have adjustment ranges of, for example, 0 and $6\pi$, or 0 and $4\pi$, or 0 and $2\pi$. The first, second and third phase shifters 1210, 1310, 1410 respond to the respective first, second and third control signals CS1, CS2, CS3 (e.g. drive current or voltage) to effect respective phase shifts. Although a $2\pi$ adjustment range is the minimum range that works, using a range of 0 to $4\pi$ or 0 to $6\pi$ provides greater adjustment range. The polarization controller 1000 also measures the output power, as shown by way of example in FIG. 1, using the output power measurement module 1500 without undue disruption, for example, using an optical directional-coupler tap as the optical tap 1510 to tap off a portion of the optical beam 1005, e.g. a small fraction such as 1%, or, for example, less than 5%, of the optical power and directs it toward a photodetector in the output power measurement module 1500. The output optical power measurement module 1500 measures optical power of the first TE-polarized output (e.g., using a photodetector). The control signal determination module 1600 determines values for the first, second and third control signals CS1, CS2, CS3, e.g. voltage values, to obtain maximum optical power by sequentially varying each of CS1, CS2 and CS3, e.g. with a voltage increment ($\Delta V1$), which may be positive or negative, while measuring the output optical power using the output optical power measurement module 1500. In the embodiment of FIG. 1, the first, second and third control signals CS1, CS2, C3, which are varying DC voltages in this embodiment, are applied to phase shifters to maximize output power to control the polarization of the optical output. The control signals may be any suitable drive signals, drive currents, or control voltages. In other words, another form of drive signal may be used instead of voltages, for example, current or power, such as a direct current level or a pulse width modulation format. It has been observed that using one or two phase shifters along their respective range may not constantly provide adequate control of the output polarization, because discontinuous jumps in the voltage value(s) are required in such less sophisticated systems to compensate for large changes in input polarization state, and these jumps cause a glitch or outage in the output light. Embodiments of the present invention use three phase-shifters on a variable polarization feed, i.e. a randomly polarized input. While it does not appear to increase efficacy, additional phase shifters could potentially also be used on the same variable polarization feed. It is worth emphasizing that the input polarization may be random and time varying, and the variation may involve a large number of loops around the Poincare sphere. In other words, the input polarization may be at any point on the Poincare sphere. The polarization controller 1000 and control method convert a random and time-varying point on the Poincare sphere to a predetermined and static (fixed or target) point on the Poincare sphere, for example, the point that corresponds to a TE output polarization. Furthermore, no matter what locus is traced by the input polarization on the sphere over time, this condition can always be met to within a predetermined accuracy. The polarization controller 1000 can be implemented on a photonic platform, such as on a silicon-on-insulator (SOI) photonic platform. Thus, the polarization rotator splitter (PRS) 1100, the three Mach-Zehnder interferometer (MZI) stages 1200, 1300 and 1400, the output optical power measurement module 1500 and the control signal determination module 1600 can be integrated into the SOI platform to provide a photonic platform based polarization controller 1000. The polarization controller 1000 may also comprise an optional output selector 1700 whose function shall be described below.

In the embodiment depicted in FIG. 1, the phase shifters PS1', PS2' and PS3' of the bottom arm of the polarization controller 1000 are shown in dashed lines as being optional, but are nonetheless useful to double the tuning range or to balance insertion loss. In embodiments of polarization controller 1000 that include the bottom arm phase shifters PS1', PS2' and PS3', these are disposed within the first, second and third MZI stages 1200, 1300, 1400 as shown.

The control signal determination module 1600 may then further provide control signals CS1', CS2' and CS3' (e.g. voltage values) to maximize optical power output. The control signals CS1', CS2' and CS3' (e.g. voltage values) may be determined by using a voltage increment $\Delta V2$, which may or may not be equal to $\Delta V1$. The optional output selector 1700 may provide both or only one of the first and second TE-polarized output(s), so that the output optical power measurement module 1500 can measure the optical power of one or both arms of the polarization controller 1000. In some embodiments, in which the control signals are applied voltages, a second voltage increment ($\Delta V1'$ and/or $\Delta V2'$) may be used to refine the determination of the voltage values, as will become apparent with particular reference to FIGS. 2 to 5.

The automatic endless polarization controller 1000 illustrated by way of example in FIG. 1 is compact, consumes little power, and exhibits low insertion loss. Moreover, the automatic endless polarization controller 1000 provides a fixed TE-polarized output for any input state of polarization (SOP). Furthermore, the rapid response time of the thermo-optic phase shifters enables rapid adjustment of the output signal. Thermo-optic phase shifters are known to have response time down to several microseconds, whereas polarization state in most practical deployment environments varies with a characteristic time of no less than several hundred microseconds. Thus, the polarization controller 1000 can react quickly enough to track the variations of input polarization to within a high accuracy. Optionally, the thermo-optic phase shifters have undercuts to reduce power consumption and thermal crosstalk, at the expense of polarization tracking speed.

Although only two stages, e.g. stages 1200, 1300, of the polarization controller 1000 are sufficient to transform any polarization state to TE-polarized output, in cases in which the input polarization varies, the first or second phase shifter 1210, 1310 may reach an end of its range and require a reset, which causes errors. The endless polarization controller 1000 includes a third phase shifter 1410 (and a third MMI coupler 1420), to achieve endless polarization tracking such that if one of the three phase shifters 1210, 1310, 1410 approaches the end of its range, it is gradually reset while the other two continue to be adjusted, such that the output state of polarization can be maintained within a predetermined accuracy of the desired TE-polarization output, regardless of how much the input state of polarization varies. It should be noted that variation of the input state of polarization refers to variation across all points of the Poincare sphere that represents all possible polarizations of light, not merely the special case of a rotation of linear polarization.

Figure 2:
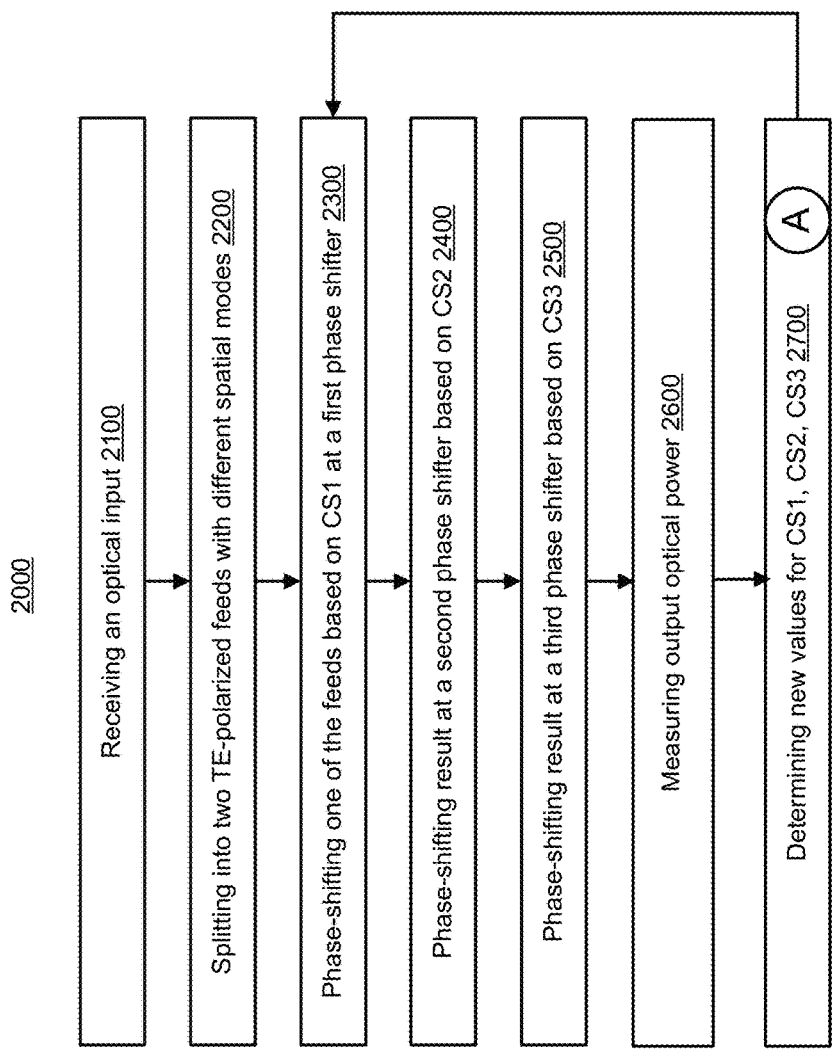
FIG. 2 is a flowchart presenting an overview of a control method.

Another aspect of the disclosure is a method 2000, depicted in FIG. 2, of providing a fixed target polarization of the optical beam 1005 having first and second orthogonal polarization components. The method 2000 entails receiving 2100 an optical beam 1005 and splitting 2200 the optical beam 1005 into first and second feeds 1010, 1020 corresponding to the first and second orthogonal polarization components, respectively, such that the first and second feeds 1010, 1020 have a same fixed state of polarization. The method 2000 entails adjusting 2300 a first optical phase delay between the first and second feeds 1010, 1020 based on a first control signal CS1, i.e. performing a first phase shifting and then mixing the first and second feeds 1010, 1020 having the first optical phase delay therebetween to provide third and fourth feeds 1230, 1240. The method 2000 entails adjusting 2400 a second optical phase delay between the third and fourth feeds 1230, 1240 based on a second control signal, i.e. performing a second phase shifting and then mixing the third and fourth feeds 1230, 1240 having the second optical phase delay therebetween to provide fifth and sixth feeds 1330, 1340. The method then entails adjusting 2500 a third optical phase delay between the fifth and sixth feeds 1330, 1340 based on a third control signal, i.e. performing a third phase shifting and then mixing the fifth and sixth feeds 1330, 1340 having the third optical phase delay therebetween to provide the optical beam 1005 having the fixed target polarization. The method 2000 then splits (taps) a portion of the optical beam 1005 using an optical tap 1510 for measuring 2600 the output optical power of the tapped portion of the optical beam 1005. Based on the output power, the control signal determination module determines 2700 new (incremented or decremented) values for the control signals CS1, CS2, CS3.

FIG. 2 thus depicts a flowchart of a method 2000 of controlling output polarization of a polarization controller 1000, e.g. a polarization controller 1000 on a silicon-on-insulator (SOI) platform, to provide a polarization of interest or "target polarization", e.g. a fixed transverse electric (TE) polarization. In another embodiment, the target polarization may be a transverse magnetic (TM) polarization. As shown in FIG. 2, the method entails measuring the optical power at the output in order to adjust the polarization controller 1000. In one specific implementation of the method 2000 of FIG. 2, the method performs a first phase-shifting 2300 based on a first control voltage at a first phase shifter (e.g., the PS1 of the MZI 1200). The result from the first phase shifter is then phase-shifted 2400 at a second phase shifter (e.g., the PS2 of the MZI 1300) based on a second control voltage. Likewise, the result from the second phase shifter is phase-shifted 2500 at a third phase shifter (e.g., the PS3 from the MZI 1400) based on a third control voltage. In this specific implementation of the method 2000, the first voltage, the second voltage and the third voltage are determined 2700 by sequentially varying each of DC1, DC2 and DC3 with a voltage increment while measuring 2600 the output optical power.

In some embodiments of the method, the determination step 2700 may involve determining control signals CS1', CS2' and CS3' for the second TE-polarized feed. The method may in that instance include a step of selecting between the two outputs (e.g., using the output selector 1700).

The process of determining the control signal values CS1, CS2, CS3 can be accomplished as follows. If CS1, CS2, CS3 notionally represent a three-dimensional space, the process involves in general a first step of using a coarse step size to scan the entire three-dimensional space to identify the point having the highest output power. This finds the coarse setting parameters. The process then involves a second step of using a fine step size to scan the region of the three-dimensional space near to the coarse setting parameters. The second step is repeated to maintain operation of the automatic endless polarization controller 1000 until the second step fails in which case the process reverts to the first step. In pseudo-code, the scanning of the three-dimensional space can be performed as follows:

```
Define an increment for CS1, CS2, CS3
For CS1 = minimum setting to maximum setting
    Increment CS1
    For CS2 = minimum setting to maximum setting
        Increment CS2
        For CS3 = minimum setting to maximum setting
            Increment CS3
            Measure present output signal
            If present output signal > best output signal then
                best output signal = previous output signal
                best CS1,CS2,CS3 = CS1,CS2,CS3
        Next CS3
    Next CS2
Next CS1
If best output signal >= desired output signal then
    Training status = pass
    Apply best CS1, CS2, CS3 to apparatus
Else training status = fail
```

Figure 3:
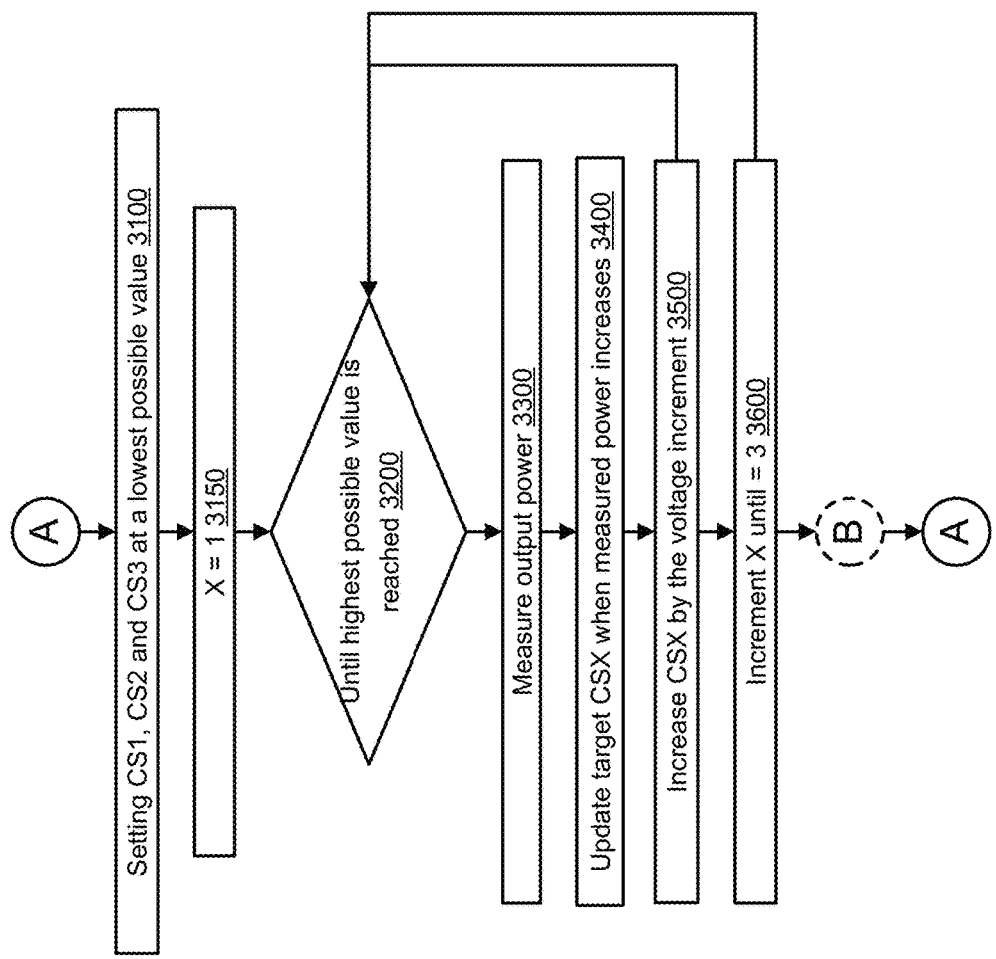
FIG. 3 is a flowchart presenting a scanning method suitable for initial adjustment when the system is activated.

FIG. 3 depicts a flowchart of another process for performing the determining step 2700 in the method 2000 where the range of possible control signal (CS) values (which correspond to the phase shifting range) are swept for each of the phase shifters PS1, PS2, PS3 using a given increment. In the example of FIG. 3, the first, second and third control signal values CS1, CS2, CS3 are initially set 3100 at a lowest possible value by the control signal determination module 1600. Skilled persons will understand that another starting value may be selected as long as the range of values is swept. By default, the target CS values for obtaining the expected polarization initially correspond to the lowest possible value and the initial power measurement is measured accordingly.

The first phase shifter (X=1) 3150 is first selected. A loop is then performed for each of the phase shifters X=1 to 3. Unless the highest possible value for CS1 is reached 3200, the optical power is measured 3300, the target CSX is updated 3400 and the CSX is increased 3500. When the measured power is higher than a previously measured power measurement, the target CSX is updated. Otherwise, the target CSX value remains unchanged. The CSX is then incremented 3500 by the increment. The loop returns to 3200, and then 3300 to 3500 are repeated unless the highest possible value for CS1 is reached. X is then incremented 3600 up to the maximum number of phase shifters so that the loop 3200 to 3500 is repeated for the next phase shifter. Steps 3100, 3150, 3200, 3400, 3500 and 3600 may be performed by the control signal determination module 1600. Step 3300 may be performed by the output optical power measurement module 1500.

Figure 4:
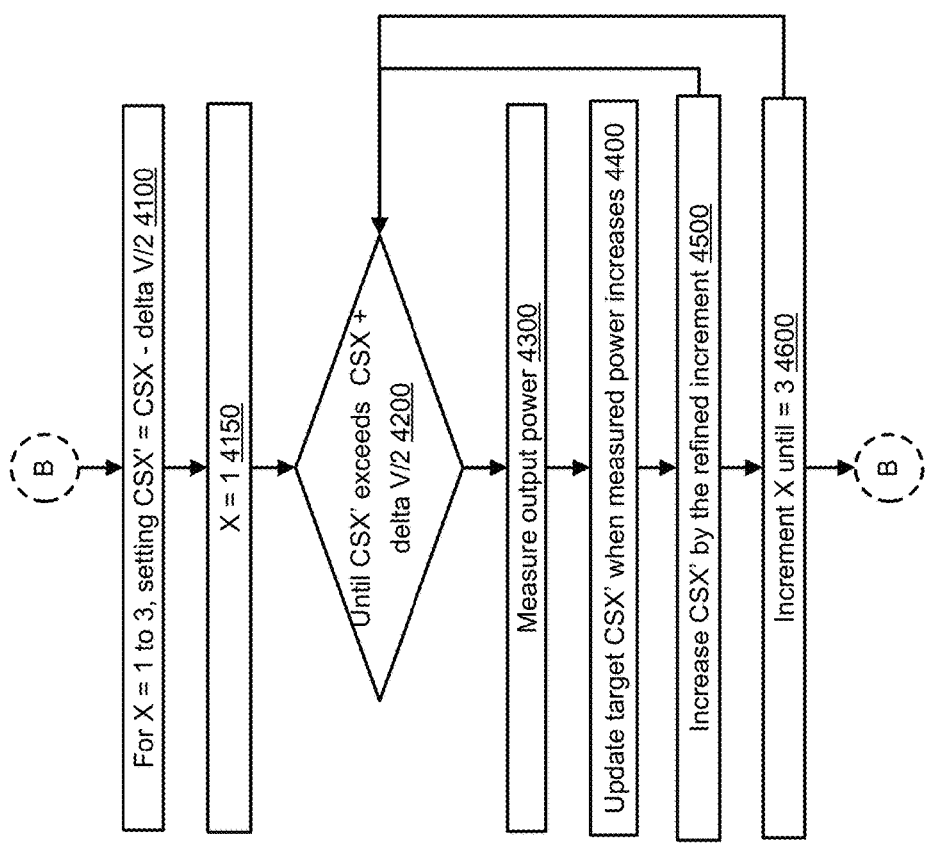
FIG. 4 is a flowchart showing additional steps of the method of FIG. 3.

FIG. 4 depicts some optional additional steps that may be performed around the target CSX values obtained from the example method of FIG. 3. As shown in FIG. 4, a range having a width equal to the previous increment may be swept using a refined increment. Specifically, for X=1 to 3, the initial CSX' target value is set to the target CSX value decreased by half of the increment previously used 4100. X is initially set to 1 at operation 4150. Unless CSX' exceeds (operation 4200) the target CSX increased by half of the increment previously used, a new output power is measured 4300, the target CSX' is updated 4400 and the CSX' is increased 4500. When the measured power is an increase compared to the previously measured value, the target CSX' value is registered 4400. CSX' is then increased by the refined increment 4500, and then 4200 to 4500 are repeated unless CSX' exceeds the target CSX increased by half of the increment previously used. X is then incremented until the total number of phase shifters is reached 4500.

In FIG. 4 the step 2700 of determining new CSX values seeks to improve the result of the polarization irrespective of the initial CSX value. This determining step 2700 may be understood as a hill-climbing method with end-of-range avoidance. From an initial value, an attempt is made to improve the polarization result around the current CS value (+ and −), for each of the phase shifters. Steps 4100, 4150, 4200, 4400, 4500 and 4600 may be performed by the control signal determination module 1600. Step 4300 may be performed by the output optical power measurement module 1500.

Figure 5:
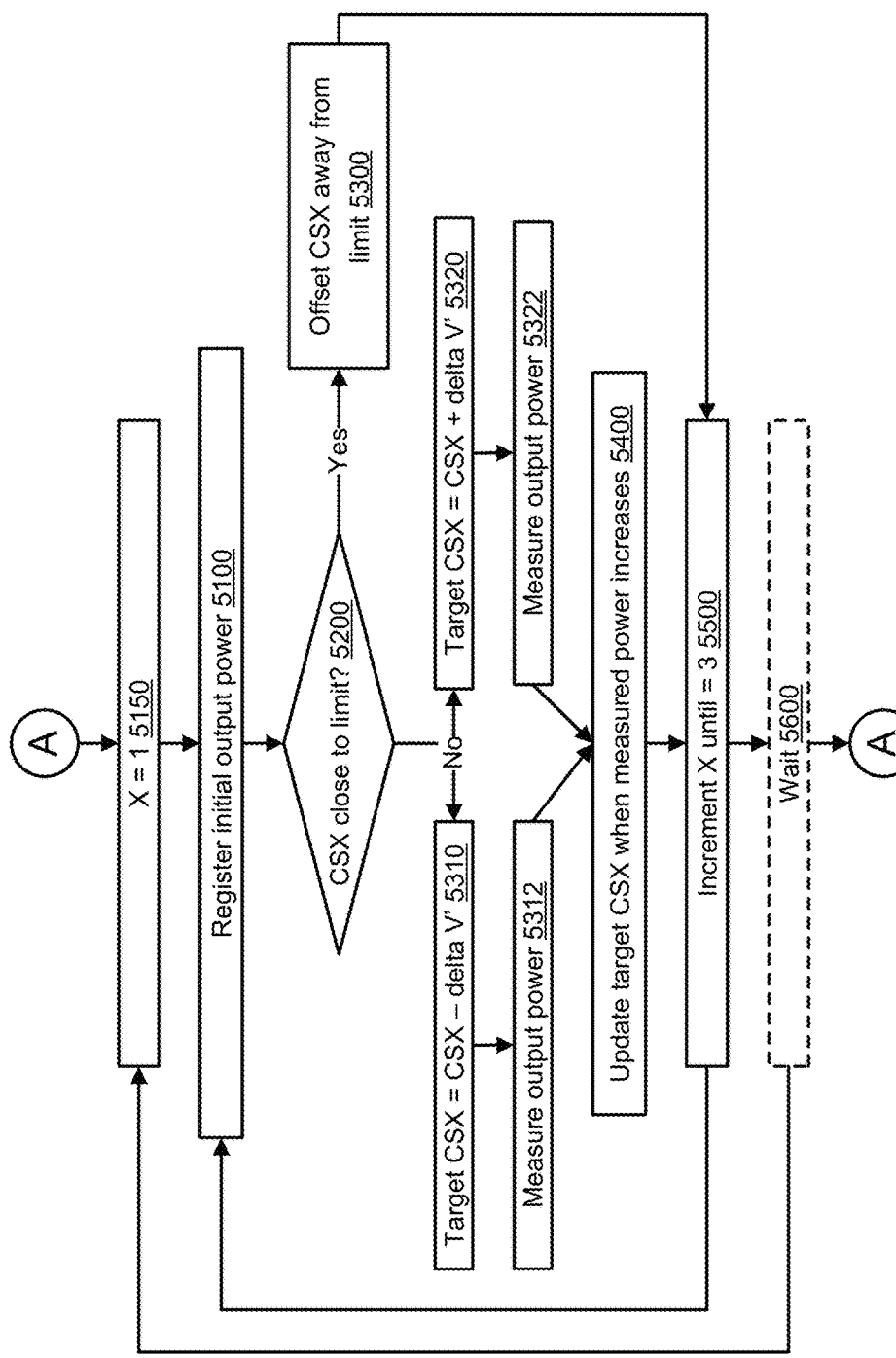
FIG. 5 depicts a flowchart of a hill-climbing method with end-point avoidance for maintaining good performance after the initial scanning method of FIG. 3.

In an alternative method depicted in FIG. 5, for a first phase shifter (X=1) 5150, an initial output power measurement is first registered 5100. If the CSX value is close to the limit of the range (5200), the CSX value is offset away from the limit 5300 by a certain value (i.e., towards the center of the range). Whether the CSX value is too close to the limit may be determined by a relative measure (e.g., percentage from the range limit such as 10% of range width) or using an absolute value (e.g., more than ΔV'). Otherwise (i.e., CSX value is not close to the limit), the target CSX is decreased by a certain value (e.g., ΔV') 5310 representing a fraction of the range width (e.g., 1%). A power measurement 5312 is taken at CSX−ΔV'. Likewise, the target CSX is increased ΔV' 5320 and a power measurement 5322 is taken at CSX+ΔV'. In some embodiments, only one of the increase or decrease ΔV' is first performed (not shown) and the other one is performed only when the measured power 5312 or 5322 does not represent an improvement over the value registered in 5100. In such a case, a decrease or an increase of ΔV' may be prioritized considering the distance from the closest range limit (not shown). In addition, the decrease and increase may use different increment values (e.g., ΔV' and ΔV''). Even though it is believed to be best to use a single ΔV or ΔV' value, different phase shifters may also have different increment values. When the measured power 5322 or 5312 represents an increase compared to the value registered in operation 5100, the target CSX is updated 5400. Steps 5100 to 5400 are then performed for the next phase shifter (increment X until=3) 5500. In some embodiments, the method may involve waiting 5600 for a clock signal before repeating the determination process 2700 shown in FIG. 5. The steps presented in FIG. 5 may be performed by the control signal determination module 1600 except for steps 5312 and 5322 which may be performed by the output optical power measurement module 1500.

In another embodiment of the hill climbing procedure (not depicted), when a cycle-time clock is received, it is determined whether the phase shifter is near maximum. If so, the phase shifter setting is decreased and the analysis is performed for the next phase shifter. Otherwise, it is determined whether the phase shifter is near minimum. If so, the phase shifter setting is increased and the analysis is performed for the next phase shifter. Otherwise, an original power measurement value of the output signal is registered. The phase shifter setting is then increased and a measurement is taken. If the measurement is better than the registered value, the new setting is kept. Otherwise, the phase shifter setting is decreased twice (i.e., equivalent to decreased once in the opposite direction) and a new measurement is taken. If the new measurement is better than the registered value, the latest setting is kept. Otherwise, the phase shifter setting is increased (i.e., back to original value) and the next phase shifter is analyzed. In the method described above, "near" shall mean that the value in question is within 10% of the maximum adjustable range. In will be appreciated however that other values may be used in other cases.

In pseudo-code, the hill climbing procedure may be written as:

```
phase increment = phase shifter range / 100
Repeat for ever {
    For each phase shifter {
        Wait until time clock
        If phase shifter setting is within 10% of maximum then
            decrement phase shifter setting
        Else if phase shifter within 10% of minimum then increment
            phase shifter
        Else {   ** try to climb hill
            Original output signal = read output signal
            Original phase shifter setting = current phase shifter setting
            Increment phase shifter setting
            If output signal is worse than Original output signal
            then {
                Decrement phase shifter setting twice
                If output signal is worse than Original output signal
                then {
                    phase shifter setting = original phase shifter
                        setting   /** Taking a step
                        made it worse. Go back to the original setting.
                }
            }
        }
    }
}
```

It is to be noted that the scanning method of FIG. 3 is optional. The hill-climbing method of FIG. 5 may also be used for a cold start, i.e. to initialize or start up the system.

Figure 6:
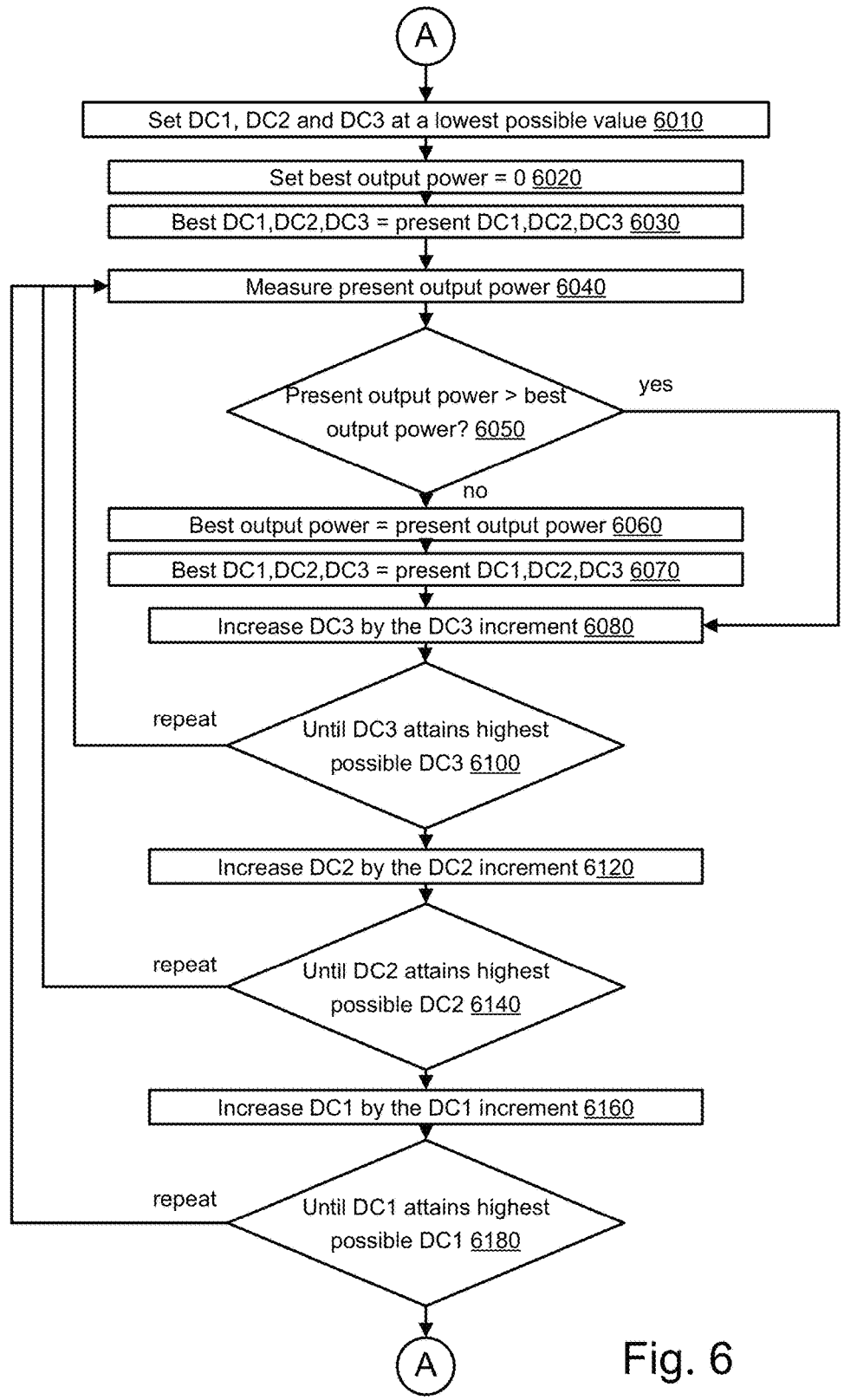
FIG. 6 depicts a flowchart presenting another scanning method suitable for initial adjustment when the system is activated.

FIG. 6 presents a method of scanning a three-dimensional space for initial adjustment when the system is activated. In pseudo-code, this method proceeds as follows, where DC1, DC2 and DC3 represent the control signals in form of three drive currents:

```
Define an increment for DC1, DC2, DC3
For DC1 = minimum setting to maximum setting
    Increment DC1
    For DC2 = minimum setting to maximum setting
        Increment DC2
        For DC3 = minimum setting to maximum setting
            Increment DC3
            Measure present output signal
            If present output signal > best output signal then
                best output signal = previous output signal
                best DC1,DC2,DC3 = DC1,DC2,DC3
        Next DC3
    Next DC2
Next DC1
```

As shown by way of example in FIG. 6, the method entails a step 6010 of setting the DC1, DC2, DC3 at a lowest possible value. At step 6020, the best output power is set to zero. At step 6030, the best DC1, DC2, DC3 values are set to equal the present DC1, DC2 and DC3 values. At step 6040, the present output power is measured. If the present output power is greater than the best output power (decision step 6050), DC3 is increased by the DC3 increment at step 6080. If not, the best output power is set to equal the present output power (at step 6060) and the best DC1, DC2 and DC3 values are set to equal the present DC1, DC2 and DC3 values (at step 6070). Until DC3 attains a highest possible DC3 value (at decision step 6100), the operations are repeated by cycling back to step 6040 as shown. After the highest DC3 is reached, operations proceed to step 6120 in which DC2 is increased by the DC2 increment. Until DC2 attains the highest possible DC2 (at decision step 6140), preceding operations are repeated by cycling back to step 6040. Once the highest DC2 is reached, the method proceeds by increasing DC1 by the DC1 increment (at step 6160). Until DC1 attains the highest possible DC1 value (at decision step 6180), preceding operations are repeated as shown by cycling back to step 6040.

Figure 7:
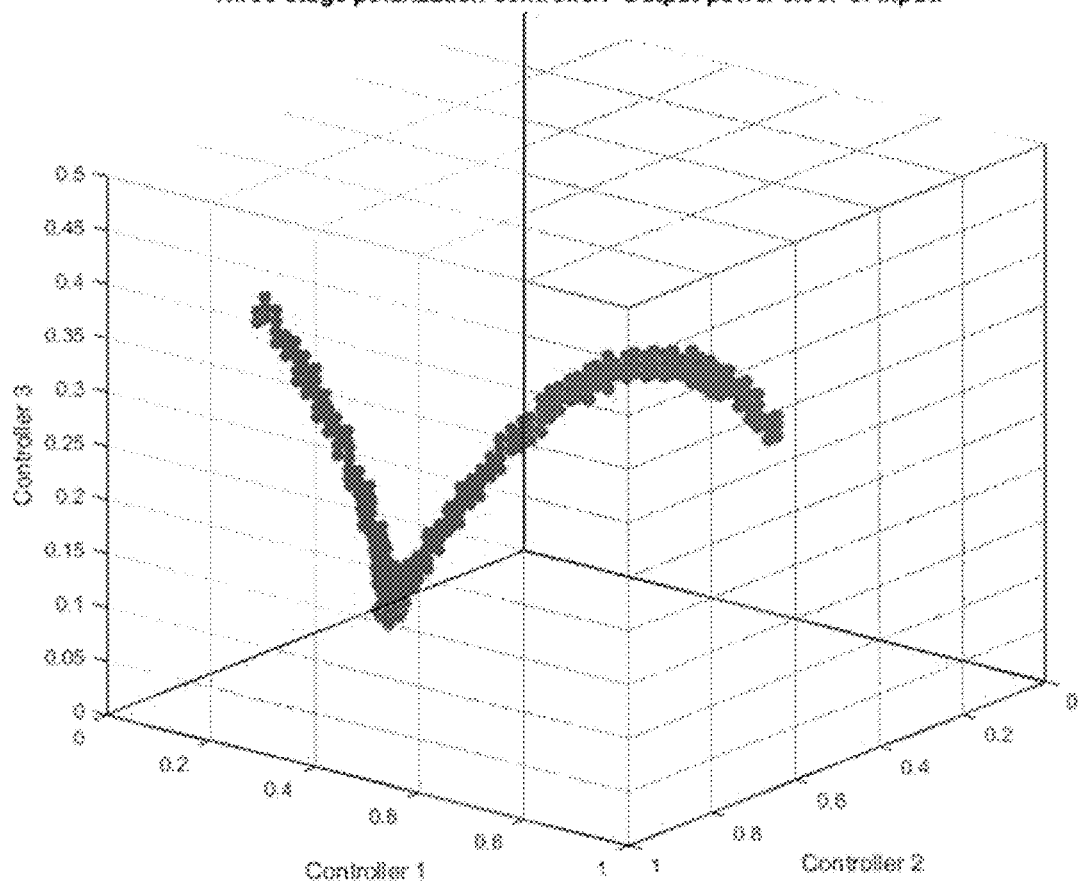
FIG. 7 is a visualization of a mathematical model representing the scanning of FIG. 6.
Figure 8:
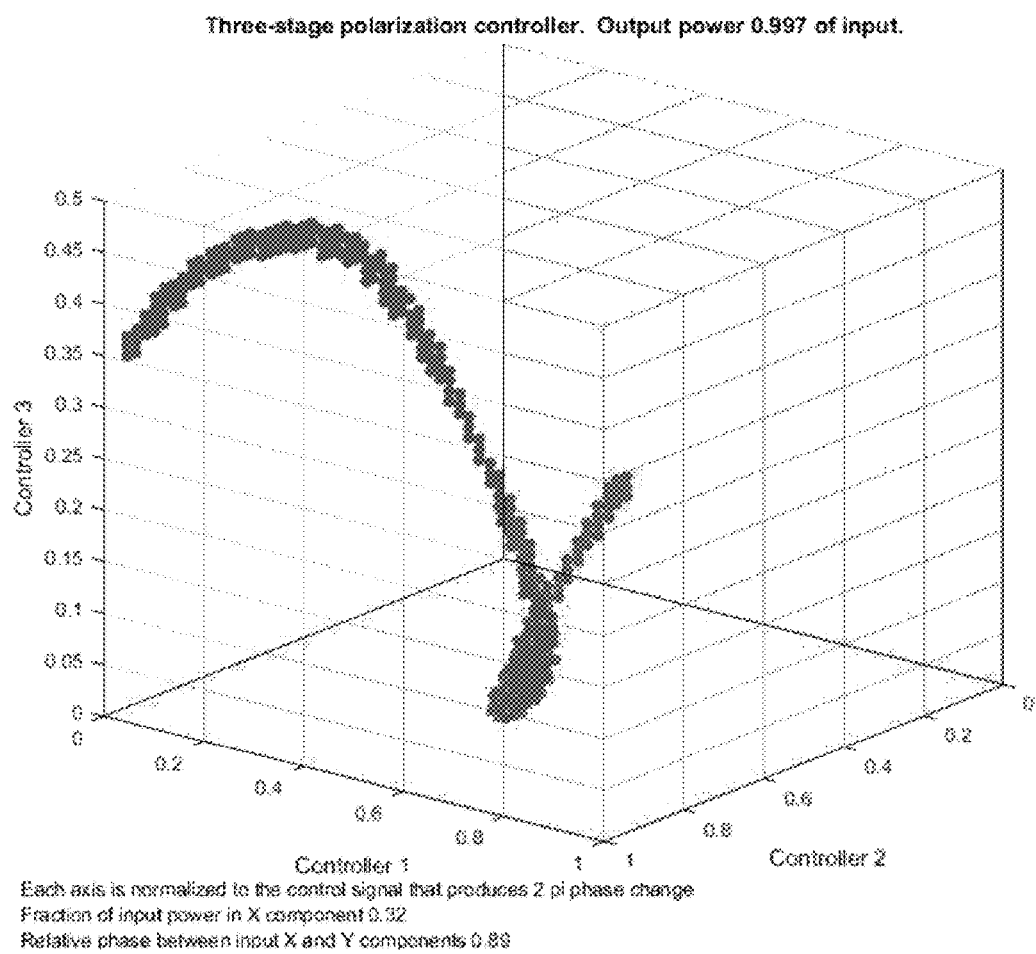
FIG. 8 is another visualization of the mathematical model representing the scanning of FIG. 6.

A mathematical illustration of the process of scanning the DC1, DC2 and DC3 values is depicted in FIG. 7 and FIG. 8. These figures depict the locus of (DC1, DC2, DC3) points that produce an output power of at least 0.997 (99.7%) of the maximum possible output power for a given input polarization state. In FIG. 7, the fraction of input power in the X component is 0.18 and the relative phase shift between input X and Y components is −0.41. In FIG. 8, the fraction of input power in the X component is 0.32 and the relative phase between the input X and Y components is 0.89. From FIGS. 7 and 8, the following observations are made. Firstly, the locus of maximum output power is a spiral about a line that is parallel to the DC1 axis. The handedness of the spiral depends on whether the fraction of optical power in the X input is greater or less than 0.5. The cross-section of the spiral is a small circle when the power ratio is near 0 or near 1. The cross-section of the spiral is a large square circle when the power ratio is near 0.5. Secondly, for the polarization controller to function suitably, the minimum adjustment range for DC1 and DC2 is a $2\pi$ phase change, but for DC3 it is a $\pi$ phase change.

The method described above enables an automatic endless polarization controller 1000 for an SOI platform. The automatic endless polarization controller 1000 converts any input polarization or SOP (state of polarization) to a fixed TE-polarized output by tracking optical power at the output ports. Optical power can be measured by an on-chip photodiode. A feedback control circuit on the chip can provide the automatic tracking and control. This automatic endless polarization controller 1000 is able to quickly track and adjust polarization in response to an optical input having a time-varying SOP. The polarization controller 1000 also exhibits low insertion loss, e.g. <−1.6 dB over C-band), low power consumption and low thermal crosstalk. Advantageously, the polarization controller 1000 requires no phase detector, no SOP detector and no polarimeter.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including", "entailing" and "containing", or verb tense variants thereof, are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

The invention claimed is:

1. A photonic platform based polarization controller for converting a first optical beam, having a first orthogonal polarization component and a second orthogonal polarization component, into a second optical beam having a single polarization component of a target polarization, the target polarization having a same polarization as the first orthogonal polarization component of the first optical beam, the polarization controller comprising:
a polarization rotator splitter (PRS) for splitting the first optical beam into a first feed and a second feed corresponding to the first and the second orthogonal polarization component, respectively, wherein the PRS further transforms the second orthogonal polarization component so that the first and the second feeds both have the target polarization;
a first Mach-Zehnder interferometer (MZI) stage coupled to the PRS and comprising a first phase shifter for providing a first optical phase delay between the first feed and the second feed based on a first control signal, and a first mixer for mixing the first feed and the second feed to provide a third feed and a fourth feed both having the target polarization;
a second MZI stage coupled to the first MZI stage and comprising a second phase shifter for providing a second optical phase delay between the third feed and the fourth feed based on a second control signal, and a second mixer for mixing the third feed and the fourth feed to provide a fifth feed and a sixth feed both having the target polarization; and
a third MZI stage coupled to the second MZI stage and comprising a third phase shifter for providing a third optical phase delay between the fifth feed and the sixth feed based on a third control signal, and a third mixer for mixing the fifth feed and the sixth feed to provide the second optical beam having the target polarization.

2. The polarization controller of claim 1 wherein the first and second mixers each comprise a 2×2 optical coupler, and the third mixer comprises a 2×1 optical coupler.

3. The polarization controller of claim 2, wherein the 2×2 and 2×1 optical couplers each comprise a multimode interference optical coupler.

4. The polarization controller of claim 1, further comprising an optical tap optically coupled to the third mixer for splitting a portion of the second optical beam, and a photodetector optically coupled to the optical tap for providing a photodetector signal based on the portion of the second optical beam.

5. The polarization controller of claim 4, further comprising a control module coupled to the photodetector and the first to third phase shifters and configured for providing the first to third control signals to the first to third phase shifters, respectively, for increasing optical power of the second optical beam based on the photodetector signal.

6. The polarization controller of claim 5, wherein the control module is configured for gradually lessening a selected one of the first to third control signals when the selected control signal reaches a pre-defined threshold, while adjusting at least another one of the first to third control signals so as to maintain the target polarization and optical power level of the second optical beam provided by the third mixer.

7. The polarization controller of claim 5, wherein the control module is configured for determining coarse setting parameters for the first, second and third control signals by scanning using a coarse step size.

8. The polarization controller of claim 7, wherein determining the first, second and third control signals comprises scanning using a fine step near the coarse setting parameters.

9. The polarization controller of claim 1, wherein the first to third MZI stages form a three-stage cascaded MZI.

10. The polarization controller of claim 9, absent a four-stage cascaded MZI.

11. The polarization controller of claim 1, wherein the photonic platform comprises silicon on insulator.

12. The polarization controller of claim 11, wherein the target polarization is a transverse electric polarization.

13. A photonic platform based polarization controller for converting an input optical beam, having a first orthogonal polarization component and a second orthogonal polarization component, into an output optical beam having a single polarization component of a target polarization, the target polarization having a same polarization as the first orthogonal polarization component of the input optical beam, the polarization controller comprising:

a polarization rotator splitter (PRS) for splitting the input optical beam into a first feed and a second feed corresponding to the first and the second orthogonal polarization components, respectively, wherein the PRS further transforms the second orthogonal polarization component so that the first and the second feeds both have the target polarization;

a first phase shifter coupled to the PRS for providing a first optical phase delay between the first and the second feeds based on a first control signal, and a first 2×2 optical coupler coupled to the first phase shifter for mixing the first and the second feeds to provide a third feed and a fourth feed both having the target polarization;

a second phase shifter coupled to the first 2×2 optical coupler for providing a second optical phase delay between the third feed and the fourth feed based on a second control signal, and a second 2×2 optical coupler coupled to the second phase shifter for mixing the third feed and the fourth feed to provide a fifth feed and a sixth feed both having the target polarization; and a third phase shifter coupled to the second 2×2 optical coupler for providing a third optical phase delay between fifth feed and the sixth feed based on a third control signal, and an output optical coupler coupled to the third phase shifter for mixing the fifth feed and the sixth feed to provide an output optical beam having the target polarization.

14. The polarization controller of claim 13, further comprising:

an optical tap optically coupled to the output optical coupler for splitting a portion of the output optical beam;

a photodetector optically coupled to the optical tap for providing a photodetector signal based on the portion of the output optical beam;

a control module coupled to the photodetector and the first to third phase shifters and configured for providing the first to third control signals to the first to third phase shifters, respectively, for increasing optical power of the output optical beam based on the photodetector signal, wherein the control module is configured for gradually lessening a selected one of the first to third control signals when the selected control signal reaches a pre-defined threshold, while adjusting at least another one of the first to third control signals so as to maintain the target polarization and optical power level of the output optical beam.

15. The polarization controller of claim 14, wherein the target polarization is a transverse electric polarization.

* * * * *